United States Patent [19]
Kaufman et al.

[11] 3,844,757
[45] Oct. 29, 1974

[54] GLASS SHEET HEATING METHOD

[76] Inventors: Lawrence L. Kaufman, 1153 Michele Dr., Toledo, Ohio 43615; Arthur Bienenfeld, 505 N. Lake Shore Dr., Chicago, Ill. 60611

[22] Filed: Mar. 5, 1973

[21] Appl. No.: 337,952

[52] U.S. Cl.......................... 65/114, 65/117, 65/350
[51] Int. Cl............................................ C03b 27/00
[58] Field of Search ............. 65/114, 117, 119, 349, 65/350

[56] References Cited
FOREIGN PATENTS OR APPLICATIONS
348,354  5/1931  Great Britain........................ 65/349
747,695  4/1933  France................................. 65/114

Primary Examiner—Arthur D. Kellogg
Attorney, Agent, or Firm—Dressler, Goldsmith, Clement & Gordon, Ltd.

[57] ABSTRACT

A method of uniformly heating a glass sheet suspended in a furnace by directing a large volume of heated flowing gas against the surface of the glass to heat the glass primarily by convection, recycling the gas and reheating the gas externally of the furnace whereby the glass is uniformly and rapidly heated to a desired temperature.

12 Claims, 6 Drawing Figures

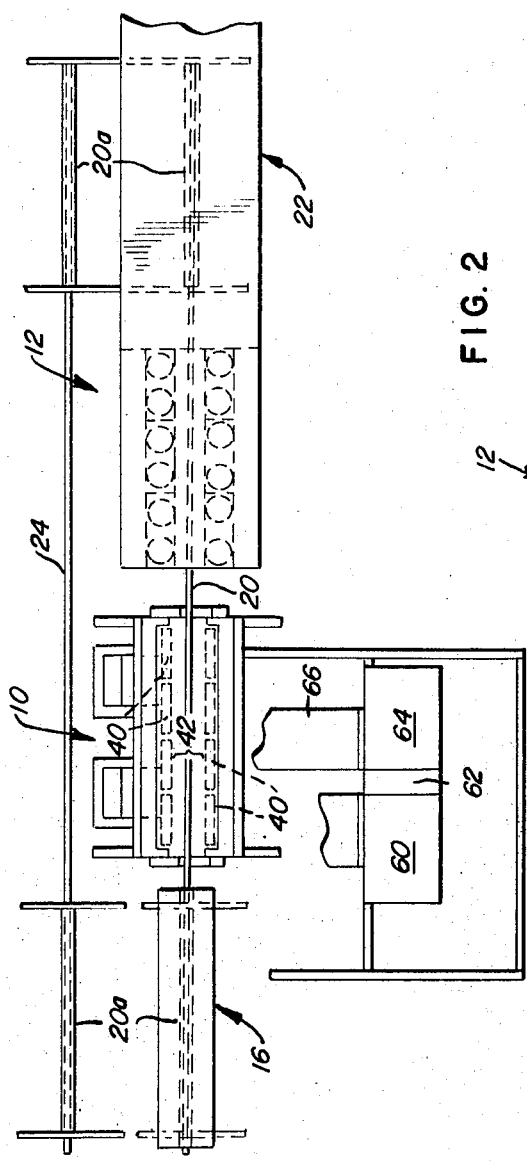
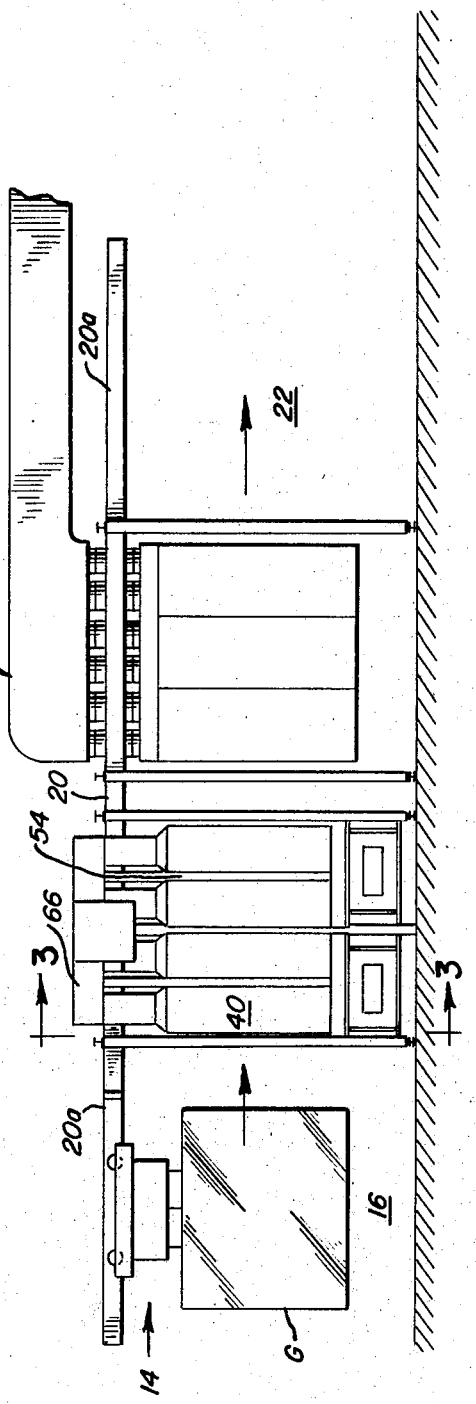

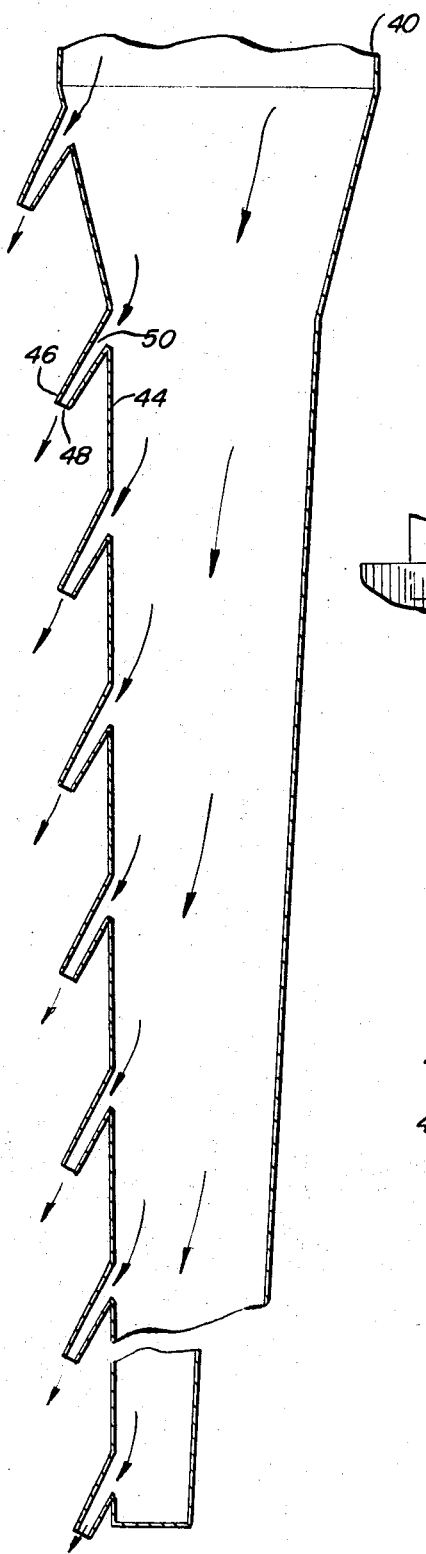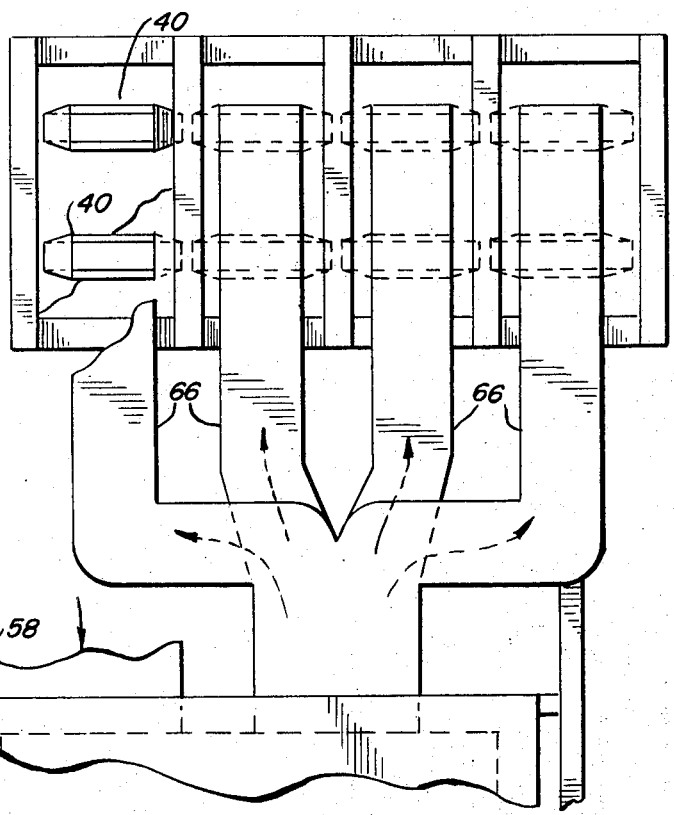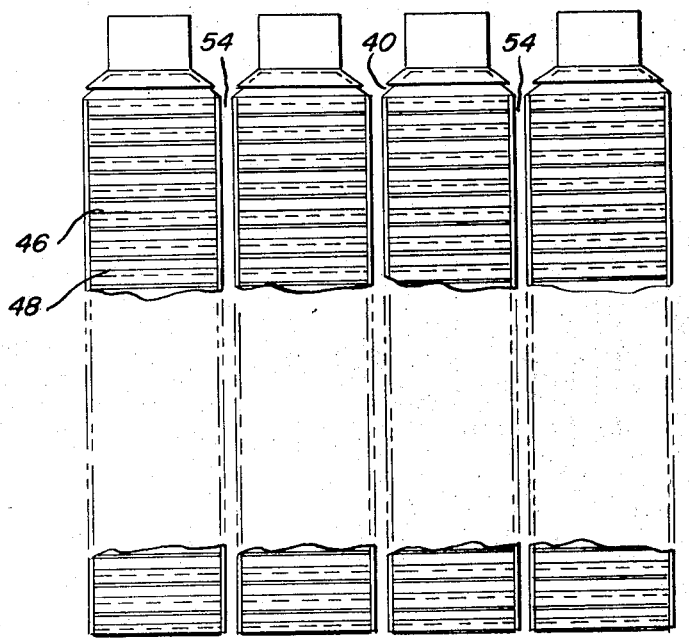

GLASS SHEET HEATING METHOD

BACKGROUND OF THE INVENTION

Glass tempering is just one of the many reasons why glass is heated to elevated temperatures. Successful tempering of glass, if it is to be accomplished without distortion, warpage or breakage, requires rapid and uniform heating of the glass to the proper temperature followed by rapid and uniform cooling or quenching of the heated glass.

The problem of rapidly and uniformly heating glass to a selected temperature is one that has received a great deal of attention and continues to receive a great deal of attention. Various glass heating systems and techniques have been utilized and variations in these techniques have been proposed, but the problem of uniform and controlled heating of glass continues to persist.

This problem has been particularly significant and difficult to correct in suspension or vertical systems—systems in which the vertically suspended glass sheets are transported through the system. In such systems, individual sheets of glass, of varying sizes, are suspended in a vertical plane from a conveyor. The vertically suspended glass is introduced into a furnace or heating system through one end and retained therein until raised to the proper temperature. The glass is then removed from the furnace through the other end and introduced into a quenching station where it is quickly cooled to effect tempering.

This type of system is particularly useful for treating large sheets of glass and for processing glass sheets of various sizes. The uniform heating problem is accentuated by variations in the glass being processed as well as by the size of the glass being heated when large sheets are being processed.

Radiant energy has been the principal technique used in such systems. It has been recognized, particularly with respect to vertical suspension type systems, that the use of radiant energy for heating glass makes temperature control and uniform heating extremely difficult. For whatever reason, radiant type suspension furnaces almost always seem to produce significant temperature gradients along the surface of the glass sheet suspended therein, either from top to bottom or from side to side or both.

Since radiation type furnaces usually incorporate a large number of electric or gas heating elements disposed in the walls of the furnace, initial attempts to correct temperature gradients have been directed to dividing these large number of heating elements into groups and controlling the operation of each group independently. Typically, a sensor disposed in the furnace in the vicinity of each group is used to control the operation of the heating elements making up that group. Theoretically, when the temperature in the vicinity of each group drops below the desired level, the heating elements in that group are energized to bring the furnace temperature in that area back to the desired level.

There are at least two reasons why this technique is not completely satisfactory, the time required after the heating elements are energized to bring that area of the furnace back to the desired temperature—the temperature recovery time—, and the probability that the end of a glass sheet in the furnace will overlap a portion of a group of heating elements.

Since the glass when inserted absorbs heat and causes a drop in temperature, those heating elements which face the glass are usually energized when the glass is inserted in response to the resulting temperature drop. If the glass being heated does not fill the furnace, those areas where there is no glass do not drop in temperature or at least drop substantially less than those areas where the glass is located. As a result, the heating elements in those areas, if energized at all, run for a considerably shorter period of time. The result is a temperature gradient across the furnace and the surface of the glass.

In addition, since the glass is being heated by radiant energy it is necessary to bring the temperature of the furnace back up to the desired level as rapidly as possible. When this occurs, the heating elements begin to cycle causing a variation in the temperature of the furnace which again produces variable temperatures across the surface of the glass.

Furthermore, when a glass sheet is removed, a "thermal shadow" remains for a period of time until the temperature throughout the furnace is again brought to a uniform level. This requires either an inordinate amount of time between the introduction of glass to be heated to allow for temperature recovery or accentuates unevenness of heat applied to the next glass sheet introduced into the furnace.

One approach for reducing the temperature variation has involved attempts to impart movement to the air within the furnace. For example, in Hordis U.S. Pat. No. 3,402,038, the air, heated by burners located in the furnace, is directed against the glass by fans located in plenum chambers within the furnace having a multiplicity of hollow tubes mounted on the face thereof. The tubes extend perpendicular to the surface of the glass and the air passing therethrough is recycled through the open back of the plenum chambers and reheated by the burners located in the furnace adjacent thereto. This approach has not been completely satisfactory since the location of burners within the furnace continues to create hot spots and the problem of bringing the recirculating air to temperature in order to maintain uniform heating remains.

Another approach is disclosed in Sleighter U.S. Pat. No. 3,293,020. That patent discloses a vertical radiant energy type furnace in which the radiant heating is supplemented by an air flow directed tangentially along the surface of the glass. This tangential air flow is supposed to overcome the temperature gradients which occur as a result of convection currents thereby improving temperature uniformity. The tangentially flowing air is initially supposed to accelerate heating of the glass at the lower temperatures and cool the surface of the glass as the glass is heated to higher temperatures.

All these various techniques are designed to overcome the deficiencies associated with radiant heating by attempting to impart some motion to the furnace atmosphere and to thereby equalize the temperature variations within the furnace.

The basic problem with all these techniques is that they are directed to overcoming the deficiencies of radiant energy heating while continuing to utilize radiant energy as a principal source for heating the glass. As a result, uniform distribution of temperature throughout the furnace remains a problem, recovery time remains an important factor and temperature gradients across the surface of the glass persist.

SUMMARY OF THE INVENTION

In accordance with the present invention there is provided a glass heating system and method which utilizes convection heating produced by high volume flowing air as the principal vehicle for heating the glass.

In the system and method of the present invention, a dynamic high volume hot flowing gas is impinged against the surface of glass sheets suspended within the furnace at an acute angle thereto to produce uniform heating of various size glass sheets introduced into the furnace and to produce uniform heating of even the largest sheets of glass. In one embodiment of the present invention, glass sheets as large as about 8 feet by 10 feet have been heated with minute temperature gradients, if any, across the surface thereof.

Since the heating of the glass is effected by the large volume of gas impinged against the surface of the glass, temperature recovery time of the furnace is no longer important since heating by radiation is a subsidiary by-product of the principal heating technique.

In accordance with the present invention, glass suspended vertically within the furnace is heated by directing a large volume of relatively high velocity hot gas against the surface of the glass at an acute angle thereto. Uniformity of temperature within the furnace is maintained by heating the gas externally of the furnace and introducing the heated gas into the furnace. The external heating of the gas substantially eliminates any hot spots in the furnace which result from location of heating elements therewithin. The volume of gas driven through the furnace produces extremely high exchange rates and maintains the desired uniformity of temperature and the necessary rapid and uniform heating of the glass suspended within the furnace.

Since the high volume gas is the principal medium of transferring heat to the glass, temperature recovery within the furnace, which happens to be rapid, is not a factor, and the gas may be heated to a temperature which produces the most uniform heating of the glass rather than at a temperature which produces the most rapid recovery of furnace temperature.

More specifically, in accordance with one aspect of the present invention a gas, typically air, is heated and driven through the furnace. Typically, the amount of gas driven through the furnace is sufficient to produce an exchange in the range of 100 to 400 times per minute in the operational area thereof. This amount of dynamic air flow has been found to be extremely efficient in producing uniform heating of the glass independently of temperature recovery time.

The dynamic air flow is introduced into the furnace through distribution ducts disposed on opposite sides of the glass suspended within the furnace. The air is diverted or directed out of the distribution ducts against the surface of the glass at a plurality of locations spaced along the direction of air flow. The gas is impinged against the surface of the glass at an acute angle thereto. The utilization of a high volume-high velocity gas flow maintains a positive pressure within the furnace and produces the desired uniformly heated glass sheets.

In one embodiment, the heated gas is introduced into the top of the furnace and directed down into a plurality of vertically extending tapered distribution ducts having a plurality of horizontally extending and vertically spaced slots in the inner wall thereof through which the heated gas is diverted and directed against the surface of the glass to be heated. The slots are located at the end of louvers formed in and at an angle to the inner walls of the distribution ducts. The louvers extend toward the glass and an angle thereto.

The gas is withdrawn from the bottom of the furnace and recycled through a substantially closed external recirculating system in which it is reheated and in which an appropriate amount of excess air or gas is introduced to maintain a positive pressure in the furnace. Adjustments to insure uniformity of heating may be effected by equalizing and adjusting the amount of gas being introduced into each of the distribution ducts and by utilizing a mixing scroll or other suitable configuration externally of the furnace and downstream of the air heater to insure complete mixing of the reheated gas flow so that the gas introduced into each of the distribution ducts is of uniform temperature.

The system and method of the present invention is particularly adaptable to utilization in large furnaces in which a plurality of distribution ducts are disposed on each side of the furnace, the amount and velocity of air being driven through the distribution ducts insuring complete coverage of the glass and uniform heating thereof even though there may exist spaces between adjacent distribution ducts.

Numerous other advantages and features of the present invention will become readily apparent from the following detailed description of the invention and of one embodiment thereof, from the claims and accompanying drawings in which each and every detail shown is fully and completely disclosed as a part of this specification and in which like numerals refer to like parts.

BRIEF DESCRIPTION OF THE DRAWING

FIG. 1 is a diagramatic plan view of a glass tempering system incorporating the present invention;

FIG. 2 is a diagramatic side view, partially broken away, of the system of FIG. 1;

FIG. 4 is a side view of a set of distribution ducts;

FIG. 5 is an enlarged sectional view of one of the distribution ducts utilized as part of the present invention;

FIG. 6 is an enlarged partial plan view showing the inlet ducts for the furnace incorporating the present invention.

DETAILED DESCRIPTION

Figure 3:
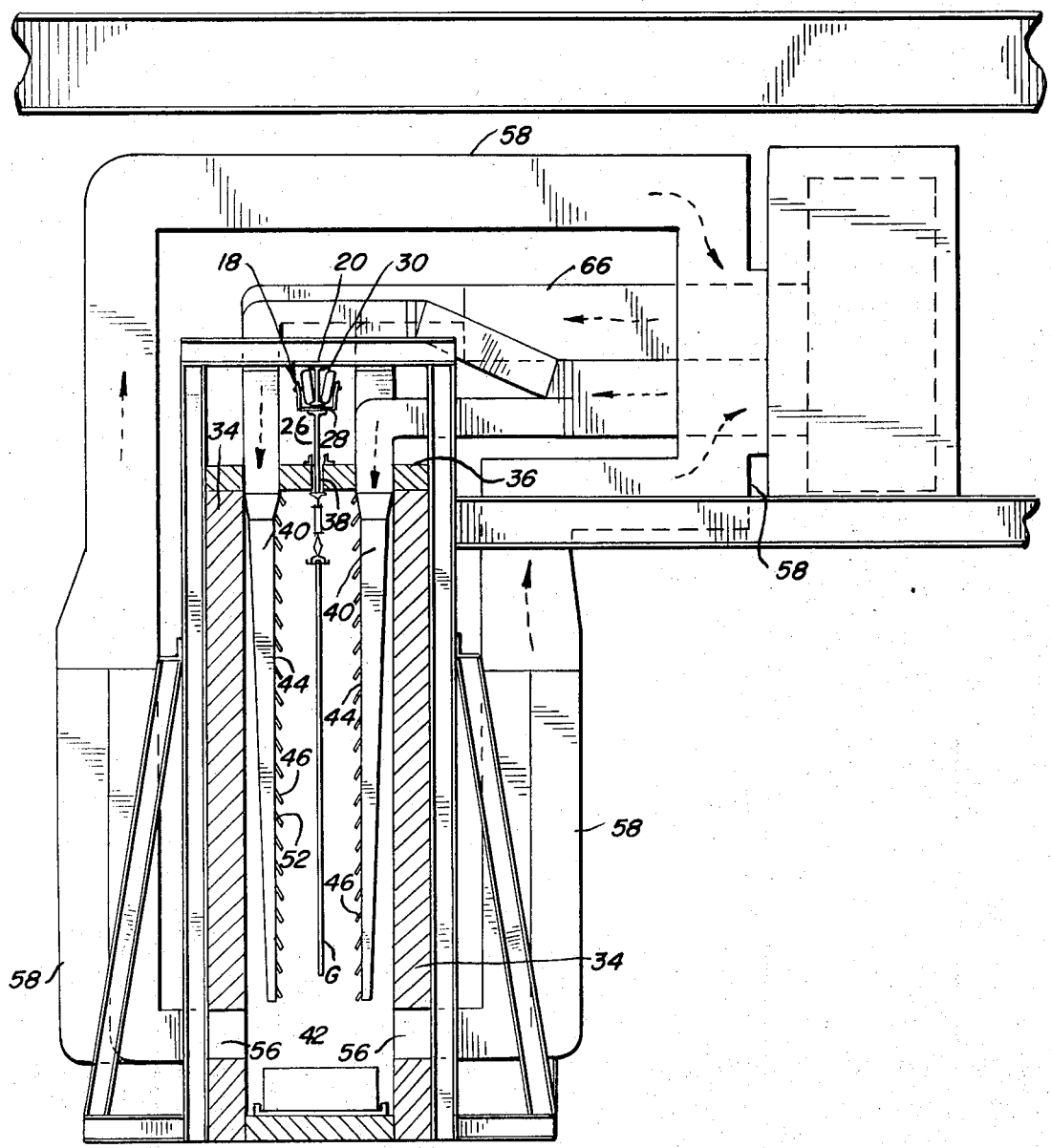
FIG. 3 is an end view, partially broken away, of a furnace system incorporating the present invention.

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated.

The heating system and method of the present invention finds particular application in use with vertical, suspension tempering systems shown diagramatically in FIGS. 1 and 2. Such systems include a furnace, or heating station 10, a quench or cooling station 12 and a transport mechanism 14 for transporting the glass through the system from one station to the other. A sheet of glass G to be tempered is "loaded" in the loading station 16 by vertically suspending the glass sheet from the transport 14 which typically takes the form of some type of conveyer 18 adapted to ride on a conveyer track, or support beam 20 extending along the center line of the system.

The conveyer track 20 is shown in the drawing in the form of an I-beam extending the entire length of the system from the loading station 16 through the furnace 10 and quench station 12 to an unloading station 22. At both the loading and unloading stations, a section 20a of the conveyer track may be laterally shifted into alignment with a return track 24 so that the conveyers 18 may be returned from the unloading station 22 to the loading station 16.

The conveyer 18 shown in the drawings takes the form of a generally vertical plate 26 supported extending down from a U-shaped truck 28 having a plurality of wheels 30 adapted to ride on the conveyer track 18. Each sheet of glass G is attached to the conveyer 18 in the loading station 16 and suspended therefrom by a plurality of tongs 32 attached to the conveyer plate 26. Suitable means (not shown) are provided to move the conveyer 18 along the conveyer track 20 from the loading station 16, into the furnace 10, from the furnace 10 into the quench station 12, and from the quench station 12 to the unloading station 22 where the tempered glass G may be removed from the conveyer 18.

In the embodiment shown in the drawing, the conveyer track section 20a is then shifted laterally into alignment with the return track 24 and the conveyer 18 is returned along the return track 24 to the laterally offset section 20a at the loading station. The section 20a of the conveyer track is then returned into alignment with the conveyer track 20 and another sheet of glass is suspended therefrom. In commercial embodiments, of course, a plurality of conveyers are utilized to permit efficient and continuous operation of the system.

The glass is heated within the furnace 10 which includes opposed side walls 34 and a top wall 36. The top wall incorporates a longitudinal slot 38 adapted to recieve the vertical conveyer plate 26, as best seen in FIG. 3. The glass G is suspended from the conveyer 18 along the center line of the furnace 10 and equidistant from the side walls 34, and is heated by a forced gas flow, e.g., air, impinged against the surface thereof.

The forced air is introduced into the furnace 10 through a plurality of tapered distribution ducts 40 which are supported from the top wall 36 of the furnace 10. The distribution ducts 40 extend substantially vertically adjacent to the furnace side walls 34 to define an operating or heating zone 42 therebetween. The inner walls 44 of the distribution ducts 40 are substantially vertical and spaced equidistant from the center line of the furnace 10 and a sufficient distance therefrom to facilitate intermixing of the gas impinging against the surface of the glass G being heated.

The inner wall 44 of each of the distribution ducts 40 are formed with a plurality of open sided horizontally extending vertically spaced inclined louvers 46 extending into the operating zone 42 at an acute angle to the plane defined by the inner wall 44 of the distribution duct 40. Each of the louvers 46 is slightly tapered so that the height of the slot 48 formed at the end thereof is slightly less than the opening 50 defined by the intersection of the louver with the inner side wall. The sides 52 of the louvers 46 are open so that the air diverted into the louvers 46 from the distribution ducts 40 fills the space 54 between adjacent distribution ducts 40 to insure complete coverage and uniform heating of the glass G suspended within the furnace 10.

As shown in the drawing, the louvers 46 are formed at an angle of about 30° to the vertical, although they may be formed at other angles, e.g., from about 20° to about 40°. The inclination of the louvers 46 is selected to cause the forced air diverted therethrough to impinge upon the glass sheet suspended within the furnace at an acute angle to the surface of the glass, while maximizing the intermixing of the air along the surface of the glass to most efficiently heat the glass to temperature.

After impinging upon the glass G and moving down the surface thereof, the heated air is withdrawn through discharge opening 56 in the bottom of the furnace side walls 34. The air is recycled through return ducts 58 extending from the discharge openings to suitable in-line direct fired or electric heater 60 where it is reheated to the desired temperature. The air is driven through the system by a suitable blower 62 located downstream of the heater 60 and passes through a mixing scroll 64 to insure uniform temperature of the air prior to being introduced into the furnace 10. The air is reintroduced into the top of the furnace 10 through inlet ducts 66 extending from the mixing scroll 64 to the top of the distribution ducts 40. As can be seen in FIG. 6, in the embodiment shown in the drawing, four distribution ducts 40 are utilized on each side of the furnace and the air is directed into inlet ducting 66 for each distribution duct externally of the furnace 10 and then introduced into the top of each of the distribution ducts 40.

In one embodiment the volume of the interior of the furnace is about 390 cubic feet while the volume within the working area is about 195 cubic feet. Air is driven through the furnace at 42,500 cubic feet per minute providing an exchange rate within the operating area in excess of 200 volumes per minute. In that embodiment, the velocity of the air at the nozzles is about 4,500 feet per minute, although satisfactory heating occurs at lower velocities. The air is heated to a temperature of about 1,250°F to about 1,400°F and recovery time after insertion of the glass can be less than 1 minute.

Under preferred operating conditions, however, the furnace is not brought to temperature as fast as possible in order that the gas may be heated uniformly while the glass is in the furnace thereby exposing the glass to gas of a uniform temperature. In a furnace this size, glass having a size of about 100 inches by about 120 inches may be uniformly heated to a desired temperature with temperature gradients measured across the height and width of the glass being less than 5°.

When the glass G is heated to temperature, the time required being dependant on the temperature of the gas itself and the thickness of the glass, the glass is removed from the furnace 10 and introduced into the quench station 12 where it is cooled by forced air blown against the surface of the glass. The details of quenching stations are well known and do not form a part of the present invention and, therefore, are not discussed in detail. The cooled tempered glass G is then removed from the quenching station 12 to the unloading station 22 where it can be detached from the conveyer 18.

Thus, there has been disclosed a glass tempering system and method in which glass is heated within a furnace by exposure to high volume relatively high velocity hot gas. Since the principal heating of the glass is effected by convection, the rapid exchange rate of the gas impinging on the surface of the glass insures that the glass is continuously exposed to uniform heating conditions across its height and width thereby substantially eliminating temperature gradients and providing the desired and necessary uniform and rapid heating of the glass.

From the foregoing, it will be observed that numerous variations and modifications may be effected without departing from the true spirit and scope of the novel concept of the invention. It is, of course, intended to cover by the appended claims all such modifications as fall within the scope of the claims.

What is claimed is:

1. A method of uniformly heating a glass sheet to a desired elevated temperature comprising the steps of: vertically suspending a sheet of glass within a furnace housing, introducing into said furnace housing a large volume of heated flowing gas, confining said gas to flow within said furnace housing in a direction generally parallel to the plane of said suspended glass and on opposite sides thereof to define an operating zone between said confined parallel gas flows, diverting portions of each of said confined parallel gas flows into said operating zone at each of a plurality of locations spaced along the direction of gas flow to form a plurality of high velocity gas streams, directing said gas streams against the opposite surfaces of said glass sheet at an acute angle thereto for a time sufficient to substantially uniformly raise the temperature of said glass sheet to a desired substantially uniform temperature across the surfaces thereof, withdrawing said gas from said furnace at a point downstream of said gas flow, recycling said withdrawn gas into said furnace housing, and heating said recycled gas externally of said furnace housing, sufficiently to maintain the desired temperature thereof.

2. A method as claimed in claim 1 including the step of diverting said gas flow into said operating zone in the form of a plurality of ribbon like turbulent gas streams each having its greater dimension transverse to the direction of the confined gas flow.

3. A method as claimed in claim 1 including the steps of introducing said gas flow into said furnace at a rate to produce a complete exchange within said operating zone of at least about 100 volumes per minute.

4. A method as claimed in claim 1 including the step of maintaining a positive pressure within said furnace.

5. A method as claimed in claim 1 including the step of diverting said gas streams into said operating zone at an angle of between about 20° to about 40° to said confined gas flow.

6. A method as claimed in claim 1 including the step of mixing the externally reheated gas before introduction into said furnace to insure uniform temperature distribution of the gas.

7. A method as claimed in claim 1 including the steps of introducing said gas into the top of said furnace, and confining said gas in vertically extending distribution ducts disposed on opposite sides of operating zone and spaced equally from said suspended glass sheet.

8. A method as claimed in claim 7 including the steps of diverting said gas streams through a plurality of vertically spaced horizontally extending slots, each located at the end of inclined louvers formed in the inner walls of said distribution ducts.

9. A method as claimed in claim 7 including the steps of selectively adjusting the air introduced into each of said distribution ducts to effect said substantially uniform temperature across the surfaces of said suspended glass.

10. A method as claimed in claim 7 including the step of diverting said air streams at a sufficient velocity to insure intermixing of said gas along the surfaces of said suspended glass sheet.

11. In a glass heating furnace system of the type in which a glass sheet is vertically suspended equidistant from a plurality of vertically extending distribution ducts disposed on opposite sides of the glass sheet to define an operating zone therebetween, the vertical inner wall of each of said distribution ducts formed with a plurality of vertically spaced inclined louvers extending into said operating zone at an acute angle to said vertical inner walls, the end of each louver defining a generally horizontal slot extending substantially the entire width of said distribution duct, a method of uniformly and rapidly heating the suspended glass sheet to a selected temperature including the steps of introducing heated gas into the top of said distribution ducts, forcing said gas down through said ducts, diverting said gas through each of said louvers and out of said slots at a uniform velocity of about 2,000 to about 4,500 feet per minute to impinge said diverted gas against the surfaces of said suspended glass for a time sufficient to substantially uniformly raise the temperature of said glass sheet to a desired substantially uniform temperature across the surfaces thereof, the volume of gas passing through said furnace effecting an exchange rate within said operating zone of about 100 to about 400 volumes per minute, withdrawing said gas from the bottom of said furnace, recycling said withdrawn gas into the top of said distribution ducts, and heating said recycled gas externally of said furnace to a temperature required for uniformly and rapidly heating the suspended glass sheet to the selected temperature.

12. A method as claimed in claim 11 including the step of continuously heating said recycled gas while said glass is in the furnace.

* * * * *